United States Patent [19]

Nurtsch

[11] Patent Number: 5,676,398
[45] Date of Patent: Oct. 14, 1997

[54] SHOULDER AND LAP BELT SAFETY DEVICE FOR TWO-WHEEL VEHICLES

[75] Inventor: Bernd Nurtsch, Gars, Germany

[73] Assignee: Bayerische Motoren Werke Aktiengesellschaft, Munich, Germany

[21] Appl. No.: 601,261

[22] Filed: Feb. 14, 1996

[30] Foreign Application Priority Data

Feb. 17, 1995 [DE] Germany ............... 195 05 448.2

[51] Int. Cl.⁶ .................................................. B60R 22/00
[52] U.S. Cl. ...................... 280/806; 280/808; 180/219; 297/484
[58] Field of Search ........................... 280/806, 807, 280/808, 801.1, 756, 290, 304.3, 304.4; 180/219, 908; 297/484, 483, 480, 479, 478

[56] References Cited

U.S. PATENT DOCUMENTS

| | | | |
|---|---|---|---|
| 2,825,581 | 3/1958 | Knight | 280/806 |
| 3,220,747 | 11/1965 | Marion | 280/807 |
| 3,819,197 | 6/1974 | Shakespear | 280/806 |
| 3,887,233 | 6/1975 | Garavaglia et al. | 297/484 |
| 4,175,787 | 11/1979 | Muskat | 297/484 |
| 4,293,052 | 10/1981 | Daswick et al. | 180/219 |
| 4,416,465 | 11/1983 | Winiecki | 280/290 |
| 4,447,069 | 5/1984 | Winiecki et al. | 280/270 |
| 4,673,190 | 6/1987 | Ahlberg | 280/304.3 |
| 4,798,399 | 1/1989 | Cameron | 280/756 |
| 5,257,671 | 11/1993 | Watkins | 180/219 |

FOREIGN PATENT DOCUMENTS

| | | |
|---|---|---|
| 2606727 | 5/1988 | France . |
| 2249759 | 4/1974 | Germany . |
| 2703799 | 8/1977 | Germany . |
| 3031141A1 | 2/1982 | Germany . |
| 3308772A1 | 9/1984 | Germany . |
| 3905108A1 | 8/1990 | Germany . |
| 4305596A1 | 2/1994 | Germany . |
| 3-86692 | 4/1991 | Japan ............... 180/219 |

OTHER PUBLICATIONS

German Patent Office Action, dated Jun. 19, 1995.

*Primary Examiner*—Kevin Hurley
*Assistant Examiner*—Peter C. English
*Attorney, Agent, or Firm*—Evenson McKeown Edwards & Lenahan, PLLC

[57] ABSTRACT

A safety device is disclosed, particularly for a two-wheel vehicle, in which a vehicle frame, a safety belt device and a seat interact for protecting the driver. In the case of an accident, the driver is fixed on the vehicle by means of the safety belt device using belt tightening devices and by the shape of the seat. The vehicle frame protects the driver from injuries caused by shock during a collision.

17 Claims, 1 Drawing Sheet

SHOULDER AND LAP BELT SAFETY DEVICE FOR TWO-WHEEL VEHICLES

BACKGROUND AND SUMMARY OF THE INVENTION

This invention relates to a safety device, particularly for a two-wheel vehicle.

It is known to protect the driver of a two-wheel vehicle by the fact that he is surrounded at least partially by the vehicle frame and is held on his seat by means of a safety belt device. In the case of an accident, the effect of such a safety device is similar to that known from passenger cars. The driver is held on the vehicle and the forces acting upon him can therefore be partially reduced by deformation zones.

U.S. Pat. No. 4,311,335 describes a two-wheel vehicle whose safety device is very complicated. As a result, it's manufacturing is very expensive which, in turn, prevents such a safety device from being accepted.

It is an object of the invention to provide a safety device of the above-mentioned type, particularly for a two-wheel vehicle, by means of which the driver's body can be rapidly and reliably fixed in its defined sitting position in the case of an accident, while, in the normal driving operation, a freedom of movement which is as large as possible and is required for driving, is to be maintained.

According to the invention, this object is achieved by providing a safety device, particularly for a two-wheel vehicle of the type having a vehicle frame which surrounds at least the driver of the vehicle at least partially, and at least one seat, said safety device comprising: a safety belt assembly including shoulder belts and two lap belts, each lap belt being guided in a looped manner through a respective one of the shoulder belts, one end of each lap belt being connected to the vehicle, while the respective other end is connected with a corresponding other end of the other lap belt by a releasable lock, the two ends of each shoulder belt also being connected on vehicle-fixed points in such a manner that each shoulder belt extends on the driver from his shoulder area to his thigh area, and at least one lap belt tightening device for fixing the driver in position on the vehicle by way of lap belts.

According to the invention, the driver's body can be fixed to the vehicle by way of the lap belts by means of at least one belt tightening device. This has the advantage that, while the driver's freedom of movement is as large as possible in the normal driving operation, in the case of an accident, the driver is fixed directly on the seat and is thus held within the vehicle frame surrounding him. A relative movement between the driver and the vehicle is avoided which protects the driver from injuries caused by shock, the driver being at the same time protected by means of the vehicle frame surrounding him.

In a preferred embodiment of the invention, the shoulder belts can also be placed on the driver's body by means of belt tighteners by way of their shoulder-side end. A safety belt device with belt tighteners on the lap belts and the shoulder-side ends of the shoulder belts rapidly and precisely fixes the driver to the seat in the case of an accident even if, at the time of the occurrence of the accident, because of the driving situation, the upper part of the body was relatively far removed from the seat surface. This ensures an optimal protection within the vehicle frame.

In an advantageous embodiment of the invention, the seat is constructed such that it prevents the driver from slipping out from under the lap belt. For this purpose, an upwardly extending ramp is formed on the front of the seat surface in the stepping area of the driver. Thus, in the case of an accident, the seat and the safety belt fix the driver in his position while he can move relatively freely during the normal driving operation. This is particularly necessary for driving a two-wheel vehicle which is steered by the whole body.

Other objects, advantages and novel features of the present invention will become apparent from the following detailed description of the invention when considered in conjunction with the accompanying drawings.

DETAILED DESCRIPTION OF THE DRAWINGS

Figure 1:
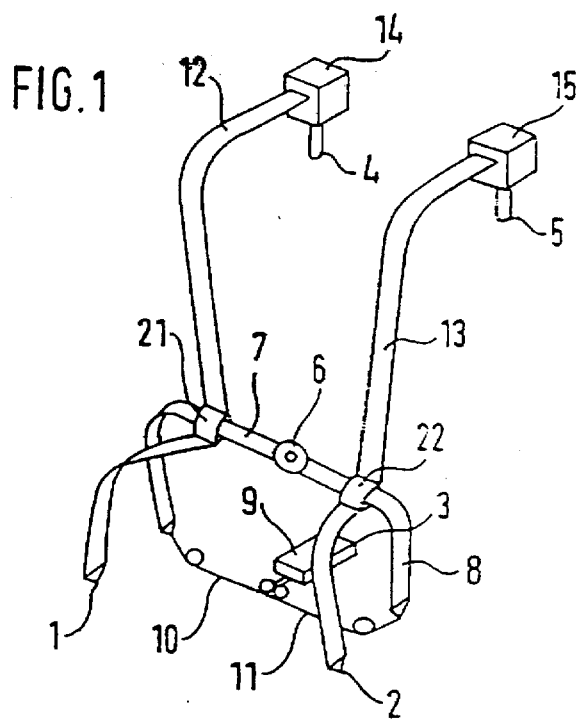
FIG. 1 is a schematic perspective view of a safety belt assembly with a belt tightening device on the lap and shoulder belts, constructed according to a preferred embodiment of the present invention.

FIG. 1 shows a safety belt assembly which is mounted on five points 1 to 5 which in use are fixed to the vehicle seat or on other vehicle parts in the proximity of the seat. The safety belt assembly is constructed symmetrically with respect to a plane which is formed by the longitudinal and vertical axis of a vehicle which is not shown, which plane extends through a forward central lock 6 of the two lap belts 7, 8. A belt tightening device 9, which is mounted on a fastening point 3 on the vehicle is connected by means of one cable line 10, 11 respectively with the vehicle-side end of each lap belt 7, 8. The two lap belts 7, 8 are mounted in such a manner that they fix the hip of the driver, who is not shown, on the seat. In alternative contemplated embodiments of the invention, the vehicle-side ends of both lap belts 7, 8 may be provided with one automatic belt retracting device respectively having an inertia lock. The two other ends of the lap belts 7, 8 can be coupled with one another by way of the lock 6.

The fastening points 1, 2 on the vehicle for a right and a left shoulder belt 12, 13 are situated on or in the proximity of the seat which is not shown, specifically in the area laterally of the thigh of the driver who is not shown. The right and the left shoulder belt 12, 13 extend from these fastening points 1, 2 over a right and a left half of the driver's upper body, which is not shown, to his shoulder area. There, the shoulder belts 12, 13 are fastened by way of one belt tightening device 14, 15 respectively on the fastening points 4, 5 on the vehicle. In alternative embodiments, belt retracting devices may be used which are not shown here and have inertia locks.

At the points at which the lap belts 7, 8 cross the shoulder belts 12, 13, each lap belt 7, 8 is looped through the respective shoulder belt 12, 13. For this purpose, brackets 21, 22 are formed at the shoulder belts 12, 13.

Figure 2:
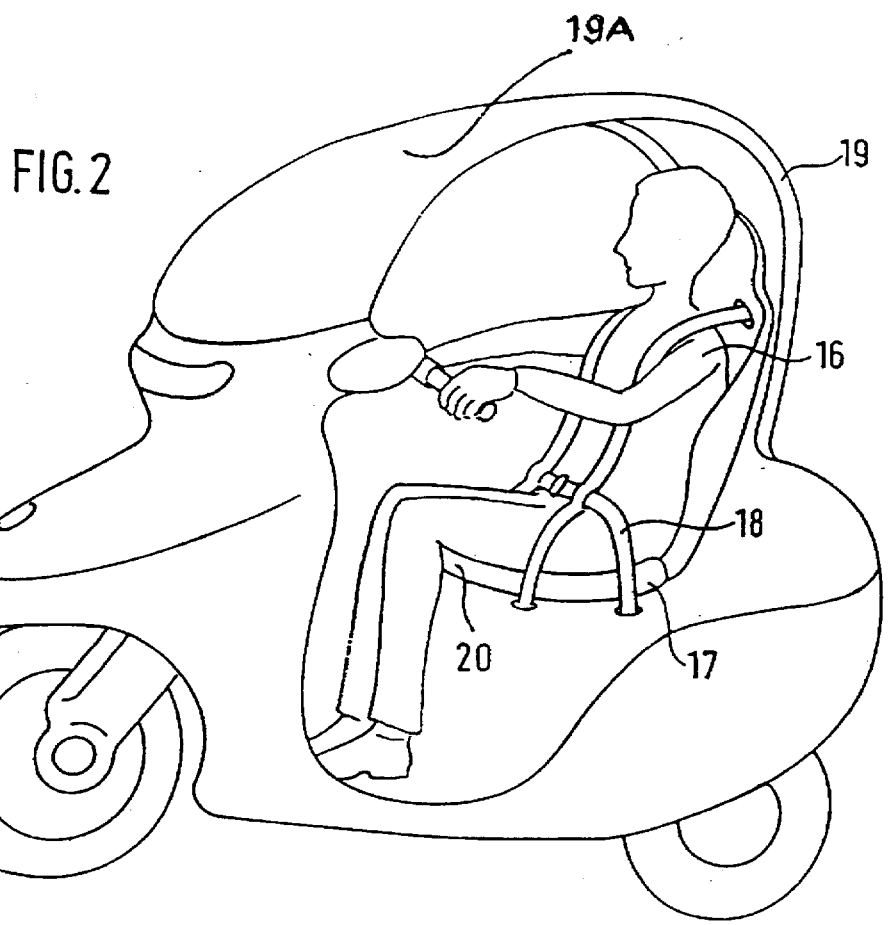
FIG. 2 is a schematic perspective view of a vehicle with a corresponding safety device consisting of the vehicle frame, the seat and a safety belt assembly according to FIG. 1.

FIG. 2 illustrates a safety belt device in an in use position installed on a two-wheel motor vehicle. The driver 16 sits on a seat 17 and is wearing a safety belt device 18 corresponding to the safety belt assembly of FIG. 1. A vehicle frame 19 partially surrounds the driver 16 and includes a plastically deformable cover part 19A which in use extends around and above the driver. In the case of an accident, the driver 16 is partially protected by the vehicle frame 19, specifically because he is held on the seat 17 by the safety belt device 18. Belt tightening devices 9, 14, 15 (FIG. 1) improve the fixing of the driver 16.

Because of the use of belt retracting devices 9, 14, 15 which are not shown and have inertia locks, the driver can move essentially freely on the seat 17 during the normal driving operation which is absolutely necessary for the secure steering of a two-wheel vehicle.

In the driver's 16 stepping area, the seat 17 has an upwardly extending ramp 20. This ramp 20 prevents, in the case of an accident, the driver 16 from slipping out from under the lap belts 7, 8.

As a result of the fact that, in the case of an accident, the driver 16 is fixed on the seat by means of the safety belt device 18, the vehicle frame 19 will protect him from injuries caused by shock and a deformation zone can be formed on the vehicle which has an additional protective effect.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Safety arrangement for a vehicle comprising:
    a vehicle seat,
    a safety belt assembly including a pair of shoulder belts and a pair of lap belts for holding a vehicle driver on the seat, each shoulder belt being connectible at a respective point adjacent a driver shoulder and below a driver thigh area at respective connecting points connectible to the vehicle, said lap belts each extending through a loop in a respective one of said shoulder belts and being connectible with one another by a releasable lock disposed intermediate the loops in the shoulder belts, opposite ends of said lap belts being connectible to the vehicle at positions below the driver thigh area, whereby the shoulder belts each extend in use along the driver from a shoulder area to a thigh area,
    at least one belt tightening device for tightening the lap belts to fix the driver in position on the vehicle seat, and
    an upwardly extending ramp section on a forward part of the seat limiting forward sliding movement of a driver held in position on the seat by the safety belt assembly.

2. Safety arrangement according to claim 1, wherein the shoulder belts are provided on shoulder-side ends thereof by way of the connecting points with shoulder belt tightening devices for fixing the driver's body on the seat.

3. Safety arrangement according to claim 2, wherein said at least one lap belt tightening device includes a belt retracting device having an inertia lock at each lap belt end connectible to the vehicle.

4. Safety arrangement according to claim 3, wherein said shoulder belt tightening devices are respective belt retracting devices with inertia locks.

5. Safety arrangement according to claim 2, wherein said shoulder belt tightening devices are respective belt retracting devices with inertia locks.

6. Safety arrangement according to claim 1, wherein said at least one lap belt tightening device includes a belt retracting device having an inertia lock at each lap belt end connectible to the vehicle.

7. Safety arrangement according to claim 1, further comprising a vehicle frame which at least partially surrounds a vehicle driver when in position on the seat.

8. A two-wheel passenger motor vehicle comprising:
    a vehicle frame which partially surrounds and protects upper body areas of a vehicle driver,
    a driver accommodating seat,
    a safety belt assembly including a pair of shoulder belts and a pair of lap belts for holding a vehicle driver on the seat, each shoulder belt being connectible at a respective point adjacent a driver shoulder and below a driver thigh area at respective connecting points connectible to the vehicle, said lap belts each extending through a loop in a respective one of said shoulder belts and being connectible with one another by a releasable lock disposed intermediate the loops in the shoulder belts, opposite ends of said lap belts being connectible to the vehicle at positions below the driver thigh area, whereby the shoulder belts each extend in use along the driver from a shoulder area to a thigh area,
    at least one belt tightening device for tightening the lap belts to fix the driver in position on the vehicle seat, and
    an upwardly extending ramp section on a forward part of the seat limiting forward sliding movement of a driver held in position on the seat by the safety belt assembly.

9. A two-wheel vehicle according to claim 8, wherein said at least one belt tightening device is a belt retracting device with an inertia lock.

10. A two-wheel vehicle according to claim 8, wherein said at least one belt tightening device includes a single belt retracting and locking device which is connected to the ends of said lap belts at the vehicle.

11. A two-wheel vehicle according to claim 8, wherein said at least one belt tightening device includes belt tightening devices for each of said lap belts.

12. A two-wheel vehicle according to claim 11, wherein each of said belt tightening devices is a belt retracting device with an inertia lock.

13. A two-wheel vehicle according to claim 12, wherein said frame includes a plastically deformable cover part which extends around and above the driver on said vehicle.

14. A two-wheel passenger motor vehicle according to claim 8, wherein said frame includes a plastically deformable cover part which extends around and above the driver on said vehicle.

15. A two-wheel passenger motor vehicle according to claim 14, wherein the shoulder belts are provided on shoulder-side ends thereof by way of the connecting points with shoulder belt tightening devices for fixing the driver's body on the seat.

16. A two-wheel passenger motor vehicle according to claim 15, wherein each of said belt tightening devices is a belt retracting device with an inertia lock.

17. A two-wheel passenger motor vehicle according to claim 8, wherein the shoulder belts are provided on shoulder-side ends thereof by way of the connecting points with shoulder belt tightening devices for fixing the driver's body on the seat.

* * * * *